United States Patent
Konig et al.

[11] 3,720,745
[45] March 13, 1973

[54] PROCESS FOR THE DIRECT POLYMERIZATION OF ACRYLONITRILE IN DIMETHYL FORMAMIDE

[75] Inventors: Josef Konig, Munich; Erich Schiefer, Offenbach(Main), both of Germany

[73] Assignee: Davy-Ashmore Aktiengesellschaft

[22] Filed: June 5, 1970

[21] Appl. No.: 43,932

Related U.S. Application Data

[63] Continuation-in-part of Ser. No. 476,584, Aug. 2, 1965, abandoned.

[52] U.S. Cl. .........264/206, 260/79.3 MU, 260/82.3, 260/82.7, 260/85.5 D, 260/85.5 R, 260/85.5 B, 260/85.5 ES, 260/85.5 HC, 260/85.5 XA, 260/88.7 R, 260/88.7 A, 260/88.7 D

[51] Int. Cl. ..........................C08f 3/76, G08f 15/02

[58] Field of Search.......260/79.3 M, 88.7 C, 88.7 D, 260/85.5 M, 85.5 F; 264/206

[56] References Cited

UNITED STATES PATENTS

| | | | |
|---|---|---|---|
| 2,453,788 | 11/1948 | Fallows | 260/88.7 |
| 2,794,793 | 6/1957 | Coover | 260/88.7 |
| 2,922,768 | 1/1960 | Mino | 260/17.4 |
| 2,922,774 | 1/1960 | Mino | 260/45.5 |
| 2,922,775 | 1/1960 | Mino | 260/45.5 |
| 3,328,332 | 6/1967 | Dannelly | 260/30.4 |
| 3,379,670 | 4/1968 | Corradi | 260/32.6 |
| 3,395,133 | 7/1968 | D'Alelio | 260/88.7 |
| 3,505,266 | 4/1970 | Suling | 260/30.8 |
| 3,505,290 | 4/1970 | Mazzolini | 260/63 |

OTHER PUBLICATIONS

Guzman, G. M., Chem. Abst., 62, 5,337f.
Guzman G. M., Chem. Abst., 63, 1,870f.

Primary Examiner—James A. Seidleck
Assistant Examiner—C. A. Henderson, Jr.
Attorney—Molinare, Allegretti, Newitt and Witcoff

[57] ABSTRACT

Methods for solution polymerization of acrylonitrile and direct spinning of the polyacrylonitrile polymers and copolymers produced thereby, which includes the steps of dissolving monomers in dimethyl formamide and solution polymerizing them in the presence of a three-component catalyst system consisting essentially of a persulphate redox catalyst system and a cerium (IV) salt co-catalyst, and directly spinning the resultant polymer-containing solution by a dry spinning process.

15 Claims, 1 Drawing Figure

PATENTED MAR 13 1973
3,720,745
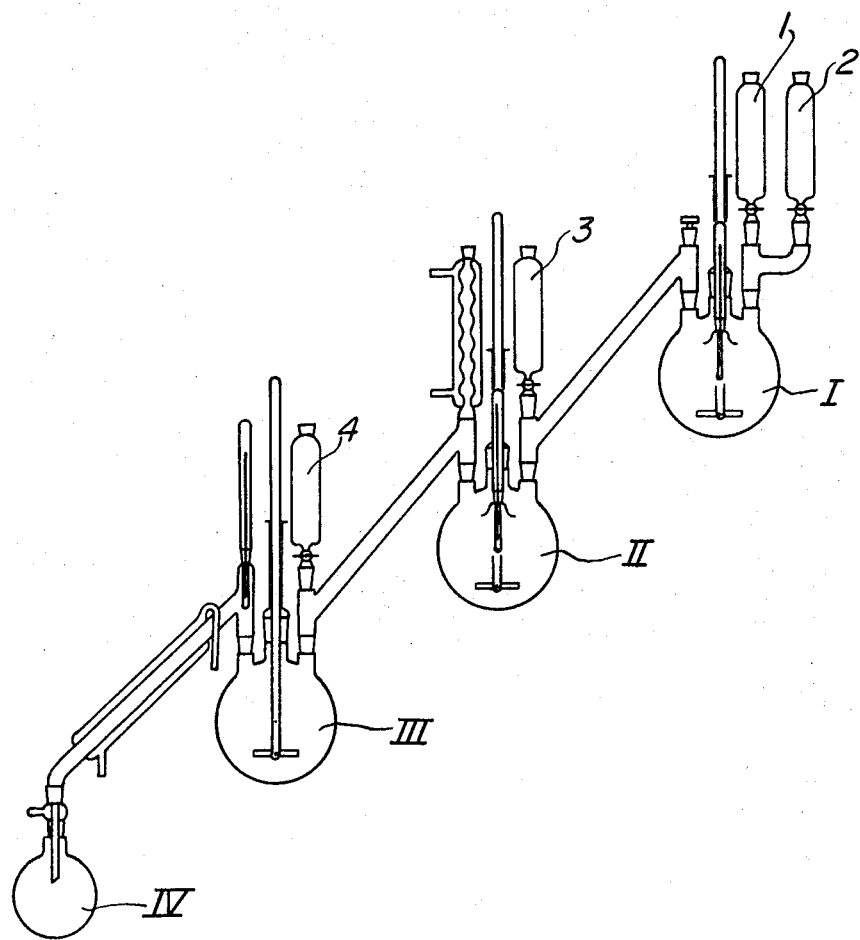
INVENTORS.
JOSEF KONIG &
BY  ERICH SCHIEFER
Bair, Freeman & Molinare
Attys.

PROCESS FOR THE DIRECT POLYMERIZATION OF ACRYLONITRILE IN DIMETHYL FORMAMIDE

CROSS-REFERENCE TO RELATED APPLICATION

This application is a continuation-in-part of our copending application Ser. No. 476,584, filed Aug. 2, 1965 now abandoned.

FIELD OF THE INVENTION

The invention relates to improvements in a process for the direct polymerization of acrylonitrile in dimethyl formamide. More specifically, the invention relates to methods for solution polymerization of acrylonitrile and direct spinning of the polyacrylonitrile polymers and copolymers produced thereby, which includes the steps of dissolving monomers in dimethyl formamide and solution polymerizing them in the presence of a three-component catalyst system consisting essentially of a persulphate redox catalyst system and a cerium (IV) salt co-catalyst, and thereafter directly spinning the resultant polymer-containing solution by a dry spinning process.

BACKGROUND

One known method of producing polyacrylonitrile spinning solutions for dry spinning processes consists of polymerizing acrylonitrile monomer (ACN) in an aqueous suspension. The acrylonitrile monomer may be used pure or may contain additives to improve the affinity for dyes. The catalyst system principally used in such aqueous suspension polymerization processes is a mixture of potassium persulphate with sodium metabisulphite, which is a redox catalyst system. As the polymerization advances, the polyacrylonitrile polymer (PACN) is precipitated and is finally separated from the aqueous phase by filtration. As such, the PACN cannot be spun from the aqueous medium, and thus is not a directly spinnable solution. In order to form a spinnable solution, the precipitated and separated PACN is dried and ground, and then is dissolved in dimethyl formamide (DMF) to form a spinnable solution. This spinning solution is then used in a dry spinning process to form filaments, fibers, and the like.

Since such prior art processes take a long time, and consume a great deal of raw material, there has been no lack of proposals for simplifying the production of spinning solutions. One such proposal, for example, is that ACN should be polymerized in dimethyl sulphoxide (DMSO). However, the resultant PACN solutions in DMSO can be further processed to fibers only by the wet spinning process, because the boiling point of the DMSO is too high to be dry spun.

Acrylonitrile is also known to have been polymerized in other solvents, such as dimethyl formamide, which should be the most suitable of solvents on account of its boiling point. However, prior art processes using dimethyl formamide solvents results in obtaining only a low molecular weight PACN, and low monomer conversion rates so that this polymerization process cannot be used for direct spinning. The low molecular weight PACN will not form suitable fibers, and bulking bodies tend to form which clog spinning nozzles and cause breaks in the spun filaments. According to Houben-Weyl, Methoden der Organischen Chemie, 4th Ed., Vol. XIV/1, page 996, using DMF, one obtains only a 17 percent monomer conversion rate and a relative viscosity, $\eta_{rel}$, of 0.34. In contrast, with suspension polymerization, $\eta_{rel}$ lies in the region of 1.5 to 1.7, with a monomer conversion rate of 80 percent.

U.S. Pat. No. 2,794,793 discloses the polymerization of acrylonitrile in N,N-dimethylformamide with a benzoyl peroxide polymerization catalyst at 50° C. for 16 hours to form what is called "preformed" polyacrylonitrile. Thereafter, the solution is cooled to room temperature and mixtures of monoethylenically unsaturated polymerizable monomers, for example methyl methacrylate and N-methylacryloamide with benzoyl peroxide catalyst is added and the reaction mixture is again heated for 16 hours at 50° C. The resulting polymer is soluble in the reaction mixture and is recovered by precipitation into water. Fibers may be spun by extruding a solution of the polymer product obtained in N,N-dimethylacetamide into a precipitating bath. This process using dimethylformamide is not shown to provide a PACN solution which is suitable for direct spinning. The added steps of preforming a PACN polymer and subsequently continuing the reaction, separating the polymer, and formation of a spinnable solution, is costly in terms of time, expense, added material usage, loss of total yield, and the total reaction time is extremely long.

Another prior art method involves the polymerization of acrylonitrile in dimethyl formamide using boron trifluoride dimethyl formamide complex, and to heat the resultant polymer solution for several hours up to 60° C. to 80° C, whereupon the unchanged acrylonitrile monomer is separated. This process produces solutions of polyacrylonitrile in dimethyl formamide, but the process suffers from the disadvantage of taking many hours time and the end product fibers are not particularly suitable.

Still another prior art process involves the polymerization of ACN in dimethyl sulphoxide with an addition of 2 percent to 20 percent of water by weight. This method bears some resemblance to suspension polymerization described above and suffers from the same disadvantages. Still other methods involve emulsion polymerization, for example also shown in U.S. Pat. No. 2,794,793, but suffer from the same disadvantages as the benzoyl peroxide catalyzed process therein and suspension polymerizations discussed above.

U.S. Pat. No. 2,922,775 describes the polymerization of acrylonitrile with a two-component redox catalyst system comprising an organic reducing agent and a ceric salt. The organic reducing agent is one which is capable of being oxidized by the ceric salt, and is capable of initiating the polymerization. The reducing agents include aldehydes, mercaptans, primary amines, glycols, carboxylic acids, keto acids, or derivatives of keto acids. The organic reducing agent-ceric salt redox system is used in this process in the presence of an organic solvent which may include benzene, toluene, xylene, naphthalene, mineral spirits, various oils, petroleum solvents, heptane, octane, kerosene, and the like. With up to 7 hours reaction at 30° C. in this process, the ACN monomer conversion to PACN is only 16.1 percent using ceric dihexyl sulfosuccinate. From an initial 25 percent concentration of ACN in the inert organic solvent, ethylether, the total yield is thus calculable as only 4 percent. If the organic reducing agent (1,2-propylene glycol) is omitted, the conversion drops to 1.7 percent and the yield to 0.43 percent No direct spinning of the resultant PACN is disclosed, the patent suggesting only that conventional extrusion techniques may be used to form filaments.

Thus, prior art techniques are characterized as involving long reaction times, low conversion, low yield polymerizations, generally of the suspension or emulsion type to form relatively low molecular weight PACN, followed by non-direct spinning involving preparation of intermediate spinning solutions. Where organic solvents are used, they are inert in character.

THE INVENTION

Objects

It is among the objects of the present invention to provide an improved process for the solution polymerization of acrylonitrile which eliminates prior art process drawbacks, including production of low molecular weight polymerizates which often contain bulking bodies.

It is another object of this invention to provide an improved process for the polymerization of acrylonitrile to produce a spinnable PACN for a dry spinning process by a continuous polymerization method.

It is another object of this invention to provide an improved catalyst system for the polymerization of acrylonitrile to produce a PACN solution that is directly spinnable without the necessity, intermediate between polymerization and spinning, of steps of recovery of the polymer and reconcentration in special spinning solutions.

It is another object of this invention to provide an improved polymerization process which leads to a directly spinnable PACN solution of up to 20 times faster than conventional processes presently used.

It is another object of this invention to provide a process of polymerization of ACN in a solvent which is a non-inert solvent for the reaction and which is used as a spinning solvent for directly spinning the PACN by a dry spinning process.

It is another object of this invention to provide a process of polymerization of ACN using monomer concentrations in solution of more than 50 percent.

It is still another object of this invention to provide a process of polymerizing ACN which process results in higher amount of conversion, total yield and higher product concentration as compared to prior art processes.

It is still another object of this invention to provide an improved catalyst-cocatalyst-solvent system for the polymerization of acrylonitrile, and copolymers of acrylonitrile with other reactive monomers, to produce PACN and PACN-copolymers suitable for direct spinning into fibers, filaments, and the like, having improved dying properties of tinting depth and permanance, and improved stretch and strength characteristics.

Still other and further objects will be evident from the specification taken as a whole.

Summary

The above objects of the invention are achieved by the discovery of a process of polymerizing acrylonitrile monomer at relatively high concentration in dimethyl formamide using a persulphate redox catalyst system and a cerium (IV) salt cocatalyst added thereto.

The reference to acrylonitrile or its abbreviation ACN used herein refers to acrylonitrile itself, as well as to other monomeric polymerizable compounds containing a polymerizable $CH_2 = C <$ group. These include vinylidene compounds and/or vinyl group containing compounds. In addition to acrylonitrile, other nitriles such as methacrylonitrile, ethacrylonitrile, $\alpha$-chloro-acrylonitrile and the like may be used. In addition, the following polymerizable monomers may be used: Styrene, including ring and side-chain substituted styrenes; polymerizable acrylic compounds such as acrylic acid and its derivatives, e.g. 1–4 carbon alkyl acrylates, $\alpha$-chloro acrylic acid, and its homologs, e.g. methacrylic acid or alkyl methacrylates, and the like; butadiene, isoprene, and haloprenes such as chloroprene; allyl compounds, such as allyl acetate, methallyl acetate, allyl acrylates; vinyl or vinylidene esters such as vinyl acetate, vinyl chloride, vinylidene chloride, vinyl propionate, vinyl butyrate; vinyl ethers such as vinyl ethyl ether, vinyl isobutyl ether; other vinyl compounds such as vinyl sulfonic acid, divinyl sulphone, divinyl sulphide, vinyl pyridene; polymerizable amides such as acrylamide, methylacrylamide and the like. The acrylonitrile may be polymerized to form a homopolymer, or may be used with the other polymerizable monomers listed above to form a copolymer. The monomeric material of this invention includes from about 85–100 percent of acrylonitrile, and from up to 15 percent by weight of one or more of the ethylenically unsaturated compounds of the type listed above.

The term persulphate redox catalyst system as used throughout refers to a redox catalyst system having an alkali metal or ammonium persulphate component or mixtures thereof and a reducing component selected from an alkali metal or ammonium salt of a sulfur-oxygen acid containing sulfur in the valency state +4. This redox system includes as the persulphate component ammonium persulphate, or lithium, sodium, potassium, rubidium, or cesium persulphate. The reducing component includes hydrogen sulphites and metabisulphites of lithium, sodium, potassium, rubidium, cesium and ammonium. Sodium metabisulphite is preferred.

The term cerium (IV) salts includes cerium salts with cerium in the +4 valency state, referred to as (IV). Preferred is cerium (IV) ammonium nitrate, but cerium (IV)-nitrate, -sulphate, -ammonium-sulphate, or -ammonium-pyrophosphate may be used. In addition, cerium (IV) salts of organic acids may be used. The cerium (IV) salt as a cocatalyst is used in an amount to make up the cerium content to be about 0.01 to 20 percent by weight of the amount of the persulphate.

Increased monomer concentration is an important advantage of the process of the present invention. In known processes, the monomer concentration may reach about 40 percent by weight, on the basis of the total weight of solution used. In contrast, in the present invention the monomer concentration is at least 50 percent, and preferably 60 – 70 percent. Using the concentrations of our invention, we are able to obtain monomer conversion percentages up to 60 percent or better, with relative viscosities, $\eta_{rel}$ of over 2. This is achieved in short periods of time on the order of 1 ½ to 3 hours with yields up to about 92 percent or better. The textile properties, particularly dying and strength, of fibers produced from the polymers of this invention are excellent.

The process according to this invention provides for continuous polymerization, as can be seen from the accompanying drawing and examples described in more detail below. However, it is also possible according to this invention to polymerize in batches and spin directly from the polymer produced in the individual batch.

Although we do not wish to be bound by theory, the catalyst system of this invention is a 3-component system in what can best be described as, in the system, a non-inert solvent, specifically dimethyl formamide (DMF). The ceric (IV) salt appears to act as a co-catalyst, as seen from comparative Example 1B, below, in addition to the 2-component persulphate redox catalyst system used.

THE FIGURE

The FIGURE illustrates an apparatus for continuous production of the polymer solution according to the process of this invention, from which the polymer solution fibers may be directly spun.

DETAILED DESCRIPTION

A detailed description of our invention follows with specific reference to the FIGURE, and the following examples are given by way of illustrating the invention without limiting its scope. Unless otherwise indicated, the percentages are percentages by weight.

Example 1

A. A quantity of 99.1 grams of acrylonitrile was dissolved, with 7.56 grams of methylacrylate and 5.34 grams of a 25 percent by weight aqueous solution of sodium vinyl sulphonate adjusted with sulfuric acid to pH 4, in 68.4 grams of dimethyl formamide. Then 0.4 gram of ammonium persulphate, 0.68 gram of sodium metabisulphite and 0.04 gram of ceric ammonium nitrate were added. The solution was heated to 45° C. and maintained at that temperature for 180 min., with thorough mixing. Finally, another 100 grams of DMF were added and the unconverted monomers, part of the DMF and the added $H_2O$ were driven off in vacuo (10 torrs).

As soon as the mass appeared viscous, distillation was stopped, with the following results:

| | |
|---|---|
| Monomer conversion | 53.3% |
| $\eta_{rel.}$ | 1.54 |
| Dry substance | 24.2% PACN |

B. Following the steps of Example 1A, but omitting the ceric salt co-catalyst, a monomer conversion of only 23 percent is obtained, and the PACN has a viscosity $\eta_{rel.}$ of only 0.91.

The PACN solution obtained using ceric (IV) salt-persulphate redox catalyst system in DMF solvent as above in Example 1A is directly dry spun by conventional techniques to produce threads having the following characteristics:

| | |
|---|---|
| Gauge | 2.0 2.0 den. |
| Strength | 2.7 g./den. |
| Stretch | 18.0% |
| Rel. knot strength | 46% |
| Rel. loop strength | 54% |

The threads are dyeable (tinted) in deep tones with cationic dyes, and have a high degree of permanence.

Example 2

With the aid of the apparatus shown in the Figure, the following method was carried out as a continuous process:

From container 1, 797 grams of ACN, 60 grams of methylacrylate, 42.5 grams of a 25 percent by weight aqueous solution of sodium vinyl sulphonate adjusted with sulfuric acid to pH 4, and 1.3 grams of potassium persulphate dissolved in 300 cc. of water ran into mixer I in 10 hours. From container 2, 800 cc. of dimethyl formamide, 2.2 grams of sodium metabisulphite and 0.13 gram of ceric ammonium nitrate dissolved in 268 cc. of water entered during the same length of time. Mixer I was maintained at a temperature of 60° C. to 62° C. The overflow from I was mixed and warmed to 68° C. in mixer II with 60 cc. of dimethyl formamide per hour, received from container 3. The transit speed was controlled to ensure a sojourn time of from 55 to 60 minutes in mixer II.

The overflow from II was kept agitated for a further 30 minutes at 50° C. in solution vessel III, which produced a completely clear solution. If necessary, small amounts of DMF may be added from container 4 to solution vessel III. The entire equipment was under a vacuum of 60 torrs, so that the unconverted monomers, the water, and part of the DMF were continuously distilled off from the reaction chamber into the receptacle IV.

The PACN solution withdrawn from solution vessel III had a content of dry substance of 21 percent by weight and a $\eta_{rel.}$ of 1.38, the conversion being 43.3 percent. Allowing for the return monomers, the yield obtained was 92 percent. With equipment in continuous operation for a period of one week, the following mean values were achieved:

| | |
|---|---|
| Monomer conversion | 49% |
| Yield | 87% |
| $\eta_{rel.}$ | 1.49 |

The concentration of the PACN solutions produced ranged from about 18 percent to 20 percent by weight. For dry spinning this is raised to 25 percent by weight by either prolonging the residence time in solution vessel III, or by further concentration in a separate vessel. The latter method has the advantage that it is a simple matter to add the other additives, such as $TiO_2$, optical brighteners and the like. The threads spun from such solutions can be colored with deep-toned dyes.

The polymer solution produced in Example 2 was dry spun as follows:

| | |
|---|---|
| Nozzle | 2400 hole. |
| Precipitant width | 140 cm. 10% aqueous solution of DMF (85°C/90°C). |
| Stretch | 1 : 4.5 in 90°C. hot 10% aqueous solution of DMF. |
| Luster imparted by | 6 rolls at 135°C. |
| Spinning quality | very good. |
| Color | Slight yellow tinge. (Contained no |
| $O_2$, but | |
| | only an optical brightener.) |
| Heat stability | 130°C. to 160°C., similar to that of "Dralon" (registered trademark), sold under the tradename "Tinopal E." |
| Color acceptance | 2.25 ("Dralon" is 2.30). |
| Textile values | Gauge: 2.0 denier |

Strength: 2.7 g./denier
Stretch: 18.0%
Rel. knot strength: 46%
Rel. loop strength: 54%

Example 3

The same procedure as in Example 2 is followed but instead of the cerium (IV)-ammonium nitrate, 0.04 gram of cerium (IV)-ammonium sulfate is used. A monomer conversion of 47.4 percent was achieved, and the PACN produced had a relative viscosity, $\eta_{rel.} = 1.36$ and a dry substance of 25.2 percent.

Example 4

99.1 grams of acrylonitrile are dissolved with 7.56 grams of acrylic acid methyl ester and 5.35 grams of 25 percent aqueous solution of sodium vinyl sulphonate adjusted with sulfuric acid to pH 4 in 68.4 grams of dimethyl formamide and 3.6 grams of water. There are then added 0.4 grams of ammonium persulfate, 0.68 gram of sodium metabisulfite and 0.04 gram of cerium (IV)-sulfate as the catalyst system. The composition is heated to 50° C. and, with good intermixing, is maintained at the same temperature for 180 minutes. Further processing takes place as described in Example 1. The evaluation yields a monomer conversion of 45 percent, a relative viscosity of $\eta_{rel.} = 1.49$ and a dry substance of 20.3 percent.

Example 5

99.1 grams of acrylonitrile are dissolved with 7.56 grams of acrylic acid methyl ester and 5.35 grams of 25 percent aqueous solution of sodium vinyl sulphonate adjusted with sulfuric acid to pH 4 in 72 grams of dimethyl formamide. There are then added 0.1 gram of potassium persulfate, 0.17 gram of sodium metabisulfite and 0.01 gram of ammonium-cerium (IV)-nitrate catalyst system. This solution is maintained for 90 minutes under agitation at 50° C. Further processing takes place as described in Example 1A. The following results were obtained:

| Monomer conversion | 30% |
|---|---|
| Relative viscosity | 1.79 |
| Dry substance | 33.5% |

Example 6

To the same monomer mixture as in Example 5 there are added 0.2 gram of ammonium persulfate, 0.35 gram of sodium metabisulfite and 0.02 gram of ammonium-cerium(IV)-nitrate as the catalyst system. The solution is maintained under agitation at 50°C. for 90 minutes. After the further processing as described under Example 1A, the following values are obtained:

| Monomer conversion | 45% |
|---|---|
| Relative viscosity | 1.45 |
| DRY SUBSTANCE | 22% |

Example 7

99.1 grams of acrylonitrile are dissolved with 7.56 grams of acrylic acid methyl ester and 5.35 grams of 25 percent aqueous solution of sodium vinyl sulphonate adjusted with sulfuric acid to pH 4 in 68.4 grams of dimethyl formamide which contains 3.6 grams of water. 0.4 gram of ammonium persulfate, 0.68 gram of sodium metabisulfite and 0.04 gram of cerium (IV)-ammonium-nitrate are then added. The solution is agitated for 90 minutes at 50° C. After further processing as described in Example 1A the following results are obtained:

| Monomer conversion | 57% |
|---|---|
| Relative viscosity | 1.53 |
| Dry substance | 21% |

Example 8

146.8 grams of acrylonitrile are dissolved together with 11.2 grams of acrylic acid methyl ester and 8 grams of 25 percent aqueous solution of sodium vinyl sulphonate adjusted with sulfuric acid to pH 4 in 36 grams of dimethyl formamide which contains 4 grams of water. To this solution there are added 1.2 grams of potassium persulfate, 2.04 grams of sodium metabisulfite and 0.12 gram of cerium (IV)-ammonium-nitrate as the catalyst system. Polymerization is carried out under agitation for 90 minutes at 70° C. After further processing as described in Example 1A the following results are obtained:

| Monomer conversion | 60% |
|---|---|
| Relative viscosity | 2.01 |
| Dry substance | 15% |

Example 9

98.4 grams of acrylonitrile, 8 grams of 25 percent aqueous solution of sodium vinyl sulphonate adjusted with sulfuric acid to pH 4 and 7.56 grams of acrylic acid methyl ester are dissolved together with 7.2 grams of water in 64.8 grams of dimethyl formamide. To this solution there are then added 0.6 gram of ammonium persulfate, 1.02 grams of sodium metabisulfite and 0.06 gram of cerium (IV)-ammonium-nitrate as the catalyst system. Polymerization is carried out under agitation for 90 minutes at 45° C. After further processing as described in Example 1A the following results are obtained:

| Monomer conversion: | 50% |
|---|---|
| Relative viscosity: | 1.55 |
| Dry substance: | 16% |

Example 10

108 grams of acrylonitrile are dissolved in 68.4 grams of dimethyl formamide which contains 3.6 grams of water. 0.4 gram of ammonium persulfate, 0.68 gram of sodium metabisulfite and 0.04 grams of cerium (IV)-ammonium-nitrate are then added. The solution is agitated for 90 minutes at 55°C. After further processing as described in Example 1A the following results are obtained:

| Monomer conversion | 48% |
|---|---|
| Relative viscosity | 1.58 |
| Dry substance | 18% |

It should be understood from the foregoing examples that a small proportion of water may be used in the reaction system for the purpose of enhancing the dissolving and reaction-accelerating properties of DMF. However, the amount of water is small enough not to change the character of the reaction; that is, the reaction is still one of solution polymerization.

With the process of the invention it is possible to produce PACN solutions directly. There is no need for the intermediate precipitation and drying of the polymer required with the usual dry spinning processes, which represents a considerable economic gain. The thread is somewhat similar to the "Dralon" type, a PACN polymer thread sold under the trade name of "Tinopal E".

What is claimed is:

1. A process for the polymerization of monomeric material containing from about 85 to 100 percent by weight of acrylonitrile and from 0 to about 15 percent by weight of at least one other ethylenically unsaturated monomeric compound, which comprises the steps of:
   A. dissolving said polymerizable monomers in a solvent consisting essentially of dimethyl formamide to form a solution, said monomer concentration is at least 50 percent by weight of said solution, and
   B. reacting said monomers in said solution to form a polymer-containing solution in the presence of a catalyst-co-catalyst system consisting essentially of:
      a. a redox catalyst system comprising
         i. from about 0.01 to 2.0 percent by weight of a persulfate selected from the group consisting of an alkali metal persulfate, ammonium persulfate and mixtures thereof, and
         ii. from about 0.01 to 4.0 percent by weight of a reducing component selected from the group consisting of alkali metal and ammonium salts of a sulfur-oxygen acid, said sulfur being in the valency state +4, said percentages by weight referring to the total amount of polymerizable monomers, and
      b. a co-catalyst consisting essentially of a cerium (IV) salt, said co-catalyst is present in an amount to make up the cerium content in a range of from about 0.01 to 20 percent by weight of said persulfate.

2. A process as in claim 1 wherein the polymerization temperature is between room temperature and about 80°C.

3. A process as in claim 1 wherein the total concentration of polymerizable monomers in dimethyl formamide is about 60 percent to 70 percent by weight.

4. A process as in claim 1 wherein the cerium content of said catalyst-co-catalyst system ranges from about 0.1 to 7.0 percent by weight of the amount of said persulfate.

5. A process as in claim 1 wherein said cerium (IV) salt is selected from ceric ammonium nitrate, ceric ammonium sulphate, and ceric sulphate, and said reducing component is selected from hydrogen sulphite and metabisulphites of lithium, sodium, rubidium, potassium, cesium and ammonium.

6. A process as in claim 5 wherein said alkali metal salt of a sulfur-oxygen acid containing sulfur in the valency state +4 is sodium metabisulfite.

7. A process as in claim 1 wherein said other ethylenically unsaturated monomeric compound is selected from the group comprising vinyl sulfonic acid, vinyl pyridine, alkyl acrylate and alkyl methacrylate, said alkyl groups having from one to four carbon atoms.

8. In a process of dry spinning polymer-containing solutions comprising the steps of solution polymerizing a monomeric material containing a major proportion of acrylonitrile monomer in a solvent to yield a polymer-containing solution, and dry spinning said polymer-containing solution directly, without separating said polymer from said solution, into a precipitant bath to form filaments, the improvement which comprises the steps of:
   a. solution polymerizing said monomeric material in a dimethyl formamide-containing solvent which is a solvent for said polymer yielded, and
   b. conducting said polymerizing in the presence of a catalyst-co-catalyst system consisting essentially of:
      1. a redox catalyst system having:
         A. a persulphate component selected from an alkali metal persulphate, an ammonium persulphate and mixtures thereof, and
         B. a reducing component selected from an alkali metal or ammonium salt of a sulfur-oxygen acid containing sulfur in the valency state +4, and
      2. a cerium (IV) salt co-catalyst.

9. A process as in claim 8 wherein said redox catalyst is present in an amount, based on total amount of monomer, of from about 0.02 percent to 6.0 percent, said co-catalyst is present in an amount yielding cerium range in a range of from about 0.01 to 20 percent by weight based on said persulfate, and said monomers are present in an amount of at least 50 percent by weight based on the total solvent-monomer solution.

10. A process as in claim 9 wherein said cerium content of said catalyst-co-catalyst system ranges from about 0.1 to 7.0 percent by weight, and is selected from ceric ammonium nitrate, ceric ammonium sulfate and ceric sulfate.

11. A process as in claim 10 wherein said redox catalyst system comprises from about 0.01 to 2.0 percent by weight of said persulfate component and from about 0.01 to 4.0 percent by weight of said reducing component.

12. A process as in claim 11 wherein said reducing component is selected from hydrogen sulfites and metabisulphites of lithium, sodium, potassium, rubidium, cesium, and ammonium.

13. A process as in claim 10 wherein said monomers are present in an amount of from 60 – 70 percent by weight.

14. A process as in claim 13 wherein said other monomer is selected from the group comprising vinyl sulfonic acid, vinyl pyridine, alkyl acrylate, and alkyl methacrylate, said alkyl groups having from one to four carbon atoms.

15. A process as in claim 12 wherein said persulfate component is selected from ammonium, potassium and sodium persulfate, and said reducing component is sodium metabisulfite.

* * * * *